United States Patent
Ellsworth

(10) Patent No.: US 12,395,513 B2
(45) Date of Patent: Aug. 19, 2025

(54) SYSTEM AND METHOD FOR EVALUATING RISK OF A VULNERABILITY

(71) Applicant: Tenable, Inc., Columbia, MD (US)

(72) Inventor: Paul Gregory Ellsworth, Sheridan, OR (US)

(73) Assignee: TENABLE, INC., Columbia, MD (US)

( * ) Notice: Subject to any disclaimer, the term of this patent is extended or adjusted under 35 U.S.C. 154(b) by 208 days.

(21) Appl. No.: 17/659,429

(22) Filed: Apr. 15, 2022

(65) Prior Publication Data
US 2023/0336579 A1    Oct. 19, 2023

(51) Int. Cl.
H04L 29/00    (2006.01)
H04L 9/40    (2022.01)

(52) U.S. Cl.
CPC .......... *H04L 63/1433* (2013.01); *H04L 63/20* (2013.01)

(58) Field of Classification Search
CPC ............................. H04L 63/1433; H04L 63/20
See application file for complete search history.

(56) References Cited

U.S. PATENT DOCUMENTS

| | | | | |
|---|---|---|---|---|
| 9,692,778 B1* | 6/2017 | Mohanty | ............. | G06F 9/45533 |
| 9,954,883 B2* | 4/2018 | Ahuja | ................. | H04L 63/1433 |
| 10,454,934 B2* | 10/2019 | Parimi | ................... | H04L 67/535 |
| 10,754,958 B1* | 8/2020 | Sidagni | ................. | G06F 21/552 |
| 11,470,106 B1* | 10/2022 | Lin | ..................... | H04L 63/1433 |
| 11,503,061 B1* | 11/2022 | Lin | .......................... | G06N 5/04 |
| 11,556,664 B2* | 1/2023 | Levy | ................... | H04L 63/1441 |
| 11,625,689 B2* | 4/2023 | Irimie | ................. | H04L 63/1433 705/321 |
| 11,757,923 B1* | 9/2023 | Vandeventer | ....... | H04L 63/1433 |
| 11,768,945 B2* | 9/2023 | Chiarelli | ............... | G06F 21/577 726/25 |
| 11,861,015 B1* | 1/2024 | Reguly | ................... | G06F 17/11 |
| 2014/0173738 A1* | 6/2014 | Condry | ................. | G06F 21/577 726/25 |
| 2014/0173739 A1* | 6/2014 | Ahuja | ................... | G06F 21/577 726/25 |
| 2017/0078322 A1* | 3/2017 | Seiver | ................. | H04L 63/1433 |
| 2017/0250979 A1* | 8/2017 | Benson | ................ | H04L 67/303 |
| 2017/0332238 A1* | 11/2017 | Bansal | ................ | H04L 67/125 |
| 2017/0346846 A1* | 11/2017 | Findlay | ............... | H04L 63/1433 |
| 2017/0353482 A1* | 12/2017 | Sommer | ............. | H04L 63/1433 |
| 2019/0158503 A1* | 5/2019 | Bansal | ............... | H04L 63/0272 |

(Continued)

OTHER PUBLICATIONS

Brash, R. "Prioritizing Asset Risk Management in ICS Security," Verve Industrial, Aug. 26, 2020.

*Primary Examiner* — Don G Zhao
(74) *Attorney, Agent, or Firm* — Muncy, Geissler, Olds & Lowe, P.C.; Daniel Podhajny

(57) ABSTRACT

Techniques, methods and/or apparatuses are disclosed that enable prioritization of vulnerabilities in different applications or the same application on different assets. A risk assessment component collects information related to the use environment, activity, functions, and configuration of a device and each of its applications. This collected information is analyzed to prioritize vulnerabilities that may be common across applications but have different levels of risk of exploitation based on their environment, activity, functions, or configuration. The risk of exploitation of a vulnerability is calculated for each asset, for each application, and each application on an asset.

22 Claims, 9 Drawing Sheets

(56) References Cited

U.S. PATENT DOCUMENTS

| | | | |
|---|---|---|---|
| 2020/0077265 A1* | 3/2020 | Singh | H04L 63/0272 |
| 2020/0137101 A1* | 4/2020 | Scott | G06F 21/577 |
| 2020/0137102 A1 | 4/2020 | Sheridan et al. | |
| 2020/0162498 A1* | 5/2020 | Ababtain | H04L 63/1416 |
| 2020/0267125 A1* | 8/2020 | Gunasingam | H04L 63/20 |
| 2020/0314147 A1* | 10/2020 | Brannon | H04L 63/107 |
| 2021/0110319 A1* | 4/2021 | Gourisetti | G06Q 10/0637 |
| 2021/0234885 A1* | 7/2021 | Campbell | H04L 63/20 |
| 2021/0243223 A1* | 8/2021 | Arora | H04L 63/1491 |
| 2021/0312351 A1* | 10/2021 | Pourmohammad | G06F 16/906 |
| 2021/0352099 A1* | 11/2021 | Rogers | G06N 20/00 |
| 2022/0021654 A1* | 1/2022 | Trentini | H04L 63/0272 |
| 2022/0027479 A1* | 1/2022 | Brannon | H04L 63/20 |
| 2022/0060474 A1* | 2/2022 | Trentini | H04L 63/0876 |
| 2022/0103592 A1* | 3/2022 | Semel | H04L 63/20 |
| 2022/0109689 A1* | 4/2022 | Hamdi | G06Q 10/0635 |
| 2022/0191230 A1* | 6/2022 | Morgan | H04L 63/1425 |
| 2022/0263852 A1* | 8/2022 | Crabtree | G06N 5/045 |
| 2022/0311796 A1* | 9/2022 | Doyle | H04L 63/1433 |
| 2022/0360597 A1* | 11/2022 | Fellows | H04L 51/212 |
| 2023/0077527 A1* | 3/2023 | Sarkar | G06Q 10/0635 |
| | | | 705/7.28 |
| 2023/0078044 A1* | 3/2023 | Robbins | H04L 63/10 |
| | | | 726/23 |
| 2023/0156031 A1* | 5/2023 | Subramanian | H04L 63/14 |
| | | | 726/25 |
| 2023/0208870 A1* | 6/2023 | Yellapragada | G06F 21/53 |
| | | | 726/22 |
| 2023/0214495 A1* | 7/2023 | Shaieb | G06F 21/577 |
| | | | 726/25 |
| 2023/0237158 A1* | 7/2023 | Sethi | G06F 21/577 |
| | | | 726/23 |

* cited by examiner

SYSTEM AND METHOD FOR EVALUATING RISK OF A VULNERABILITY

TECHNICAL FIELD

Various aspects and embodiments described herein generally relate to the detection of vulnerabilities, comparing aspects of vulnerabilities, and calculating scores for vulnerabilities or prioritizing vulnerabilities.

BACKGROUND

Computers and computer networks often have many active or unpatched vulnerabilities. These vulnerabilities may be identified by scanners, plugins, or other detectors. Within a computer network the many vulnerabilities are recorded or tracked. Depending on the workload and availability of security engineers, these vulnerabilities may or may not be fixed or patched. Furthermore, not all vulnerabilities in assets are exposed to intrusions or threats (e.g., air gapped assets). Prioritizing the vulnerabilities for patching or remediation typically involves many different factors and such prioritizing is increasingly necessary given the number of vulnerabilities present at any given time.

Because many different factors play into prioritizing a vulnerability and even the same vulnerability may not pose the same risk in all places, the industry needs a way to prioritize vulnerabilities for remediation that is not only device related (e.g., high value target risk).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of prioritizing vulnerabilities in applications of a system includes obtaining risk information corresponding to one or more assets of the system; scanning the one or more assets for first application information relating to at least two applications installed on the one or more assets; and determining a risk score specific to a vulnerability or a set of vulnerabilities and specific to at least one first application of the at least two applications installed on the one or more assets, the risk score being based on the risk information and the first application information.

In an aspect, a system to prioritize vulnerabilities includes a memory; and at least one processor coupled to the memory, wherein the memory and the at least one processor are configured to: obtain risk information corresponding to one or more assets; scan the one or more assets for first application information related to at least two applications installed on the one or more assets; and determine a risk score specific to a vulnerability or a set of vulnerabilities and specific to at least one first application of the at least two applications installed on the one or more assets, the risk score being based on the risk information and the first application information.

In an aspect, a system that determines risk of vulnerability exploitation includes at least two hardware or virtual hardware assets, the at least two hardware or virtual hardware assets having at least two software applications installed thereon; at least one endpoint agent that: extracts first application information corresponding to the at least two software applications, logs environmental and activity information for the at least two hardware or virtual hardware assets, the environmental and activity information corresponding to a first set of risk factors, collects functional information corresponding to the at least two software applications, collects configuration information corresponding to the at least two software applications, the functional information and the configuration information corresponding to a second set of risk factors, and generates a risk score for exploitation of a vulnerability or a set of vulnerabilities for each application of the at least two software applications based on the first set of risk factors, the second set of risk factors, and the first application information.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and implementations described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
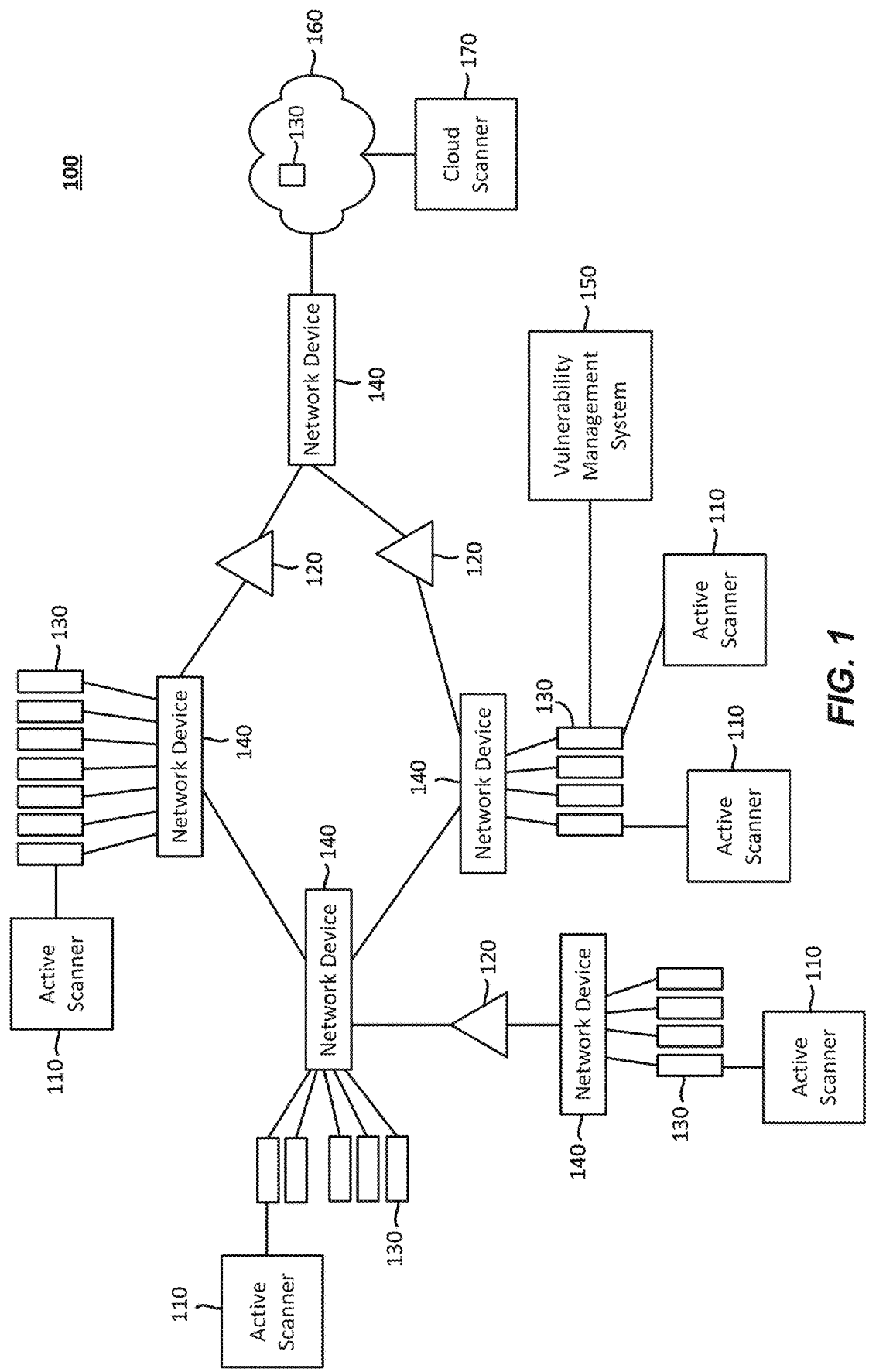
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, terms "host", "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), transport layer security (TLS) certificate, etc.). For example, the various aspects and embodiments described herein contemplate that an asset or host may be a physical electronic object such as, without limitation, a desktop computer, a laptop computer, a server, a storage device, a network device, a phone, a tablet, a wearable device, an Internet of Things (IoT) device, a set-top box or media player, industrial control system, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof.

Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

FIG. 1 illustrates an exemplary network 100 having various assets 130 that are interconnected via one or more network devices 140 and managed using a vulnerability management system 150. More particularly, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

The assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often-unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations.

Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

The network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent.

Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
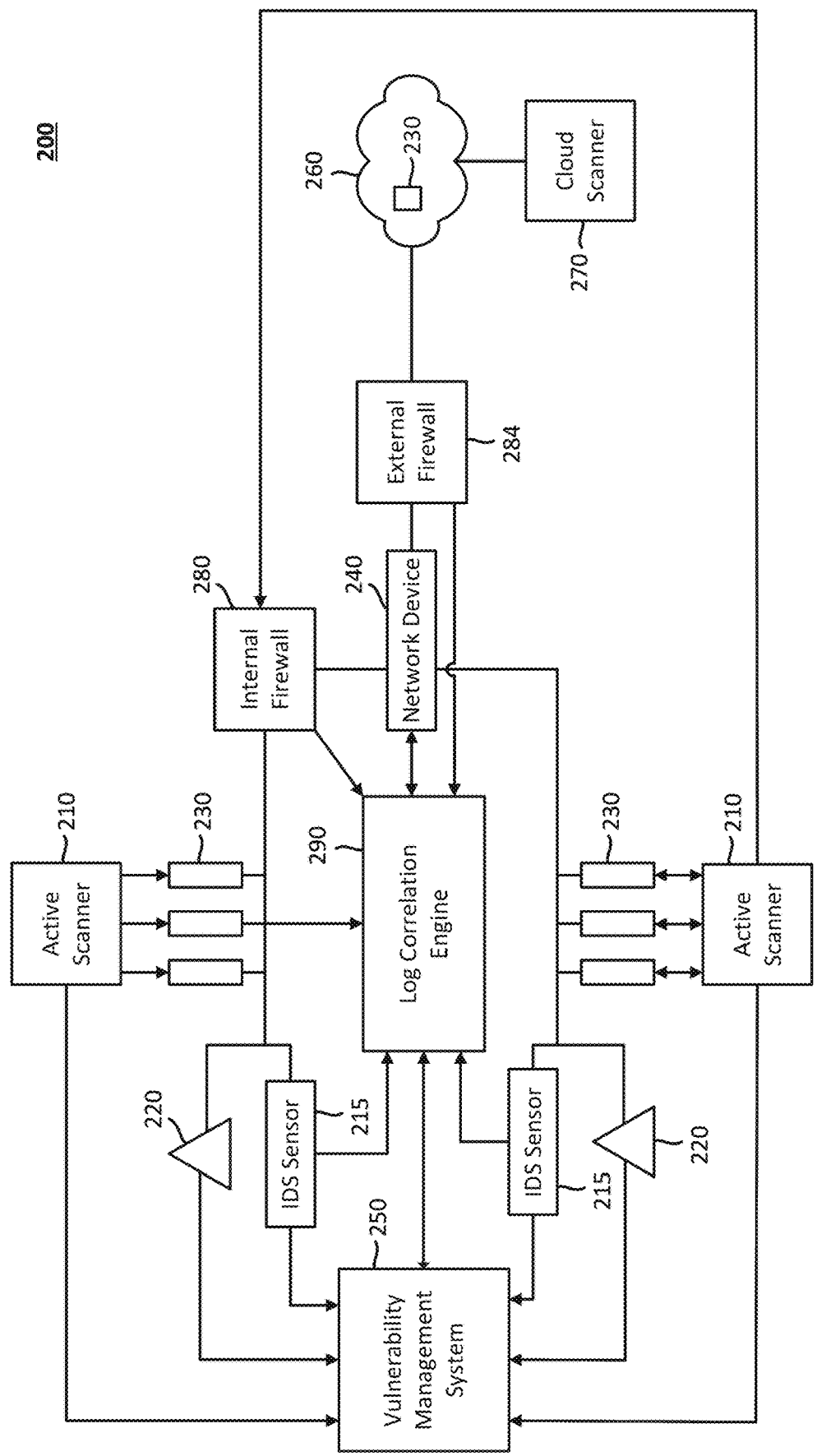
FIG. 2 illustrates another exemplary network having various assets that can be managed using a vulnerability management system, according to various aspects.

FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Throughout the network 200 and at endpoints, plugins may be deployed to identify particular vulnerabilities. A "plugin" may include logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista: 6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database. A plugin may be designed to identify a particular CVE based on a CPE. The plugin may operate to apply rules (e.g., filters, signatures, code snippets, version numbers) to various applications and executables to identify the relevant vulnerability.

Plugins may report to a database or security server (e.g., a vulnerability management system or a log correlation engine) the associated CPE for the application containing a vulnerability matched by the plugin and the CVE of the vulnerability. Plugins may include instructions that enable further information gathering capabilities with respect to the application containing the CVE. The plugin may be integrated or executed by an endpoint agent with authorized access to the end point hardware and software.

Figure 3:
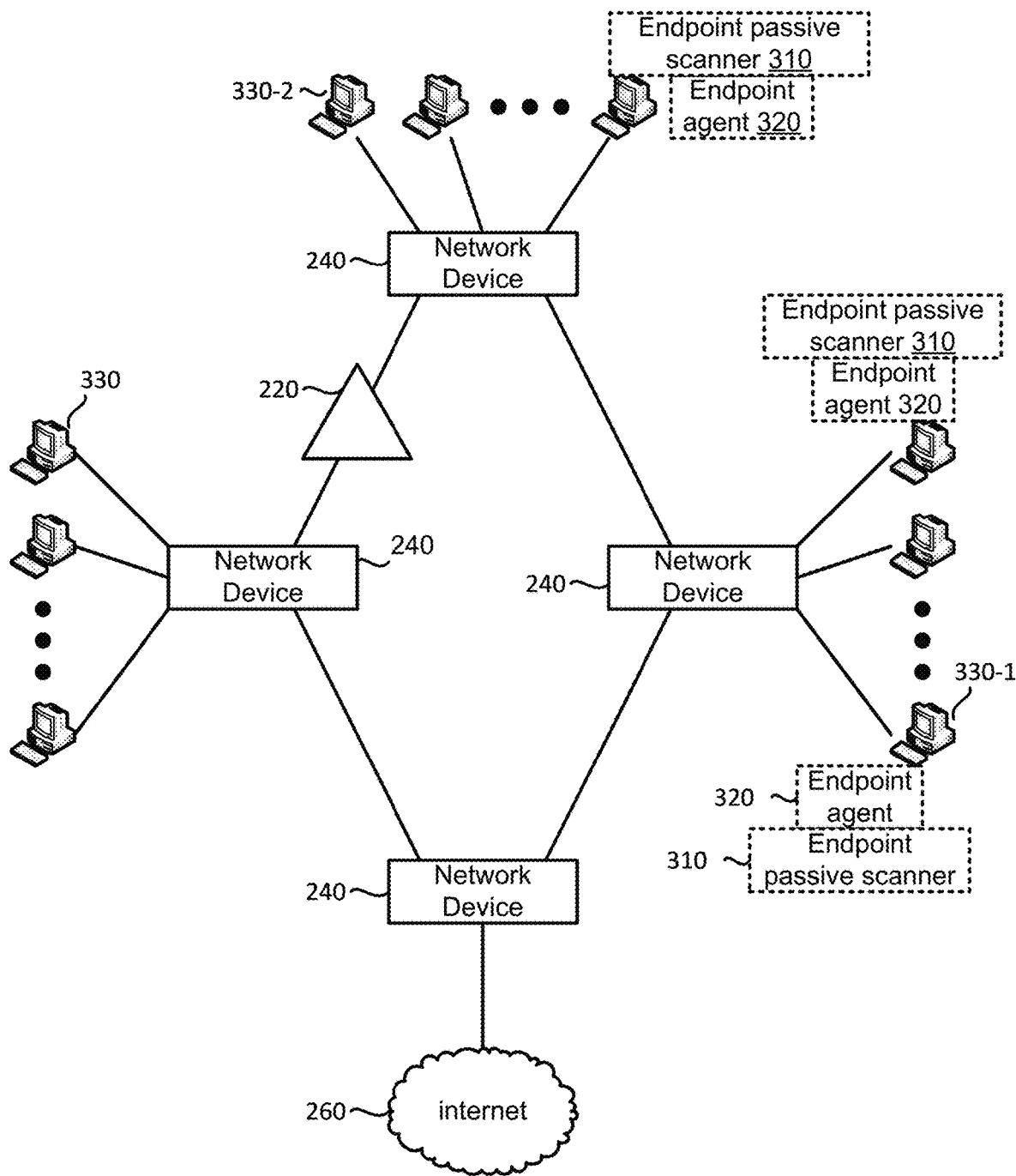
FIG. 3 illustrates another exemplary network having various assets and endpoint devices with monitoring, according to various aspects.

FIG. 3 illustrates an enterprise network with endpoint devices and endpoint scanners/agents. An endpoint passive scanner 310 may be configured to discover one or more assets of the network 300 and/or identify one or more vulnerabilities based on the detected information. Assets may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 300, cloud instances hosted in off-site server environments, etc.). Those skilled in the art will appreciate that the assets listed above are intended to be exemplary only and that the assets associated with the network 300 may include any suitable combination of the above-listed asset types and/or other suitable asset types.

In one implementation, assets of the network 300 may include one or more network entities (e.g., endpoint devices, hosts, servers, network devices, etc.), one or more applications and/or services running on the one or more network entities, operating systems running on the one or more network entities, etc. Vulnerabilities may include one or more vulnerabilities associated with the one or more applications running on one or more network entities and/or one or more vulnerabilities associated with one or more services running on the one or more network entities.

It should be noted that discovery of assets and/or vulnerabilities may also include discovery of attributes of the assets and/or vulnerabilities. For example, attributes of a network entity asset may include its hardware configuration (e.g., number and/or types of processors, memory capacity, etc.), operating system, and so on. As another example, attributes of an application asset may include its version number, installation/activation date, license limitations, and so on. As a further example, attributes of a vulnerability may include its name, category (e.g., virus, worm, spyware, trojan, etc.), and so on.

An endpoint scanner 310 may be configured to provide a report of the discovered assets and/or the identified vulnerabilities to a vulnerability management system 250, which may be external to corresponding endpoint device 330. For ease of reference, such report may be referred to as "asset-vulnerability report". For example, endpoint passive scanner 310-1 may provide its asset-vulnerability report to the vulnerability management system 250.

The vulnerability management system 250 may use the information provided by the endpoint passive scanners 310 to remediate and otherwise manage the network 200. The vulnerability management system 250 may also use data provided from passive scanners 220. For example, the vulnerability management system 250 may build a topology of the network—i.e., network topology—based on asset-vulnerability reports from one or more endpoint passive scanners 310. The network topology may include assets of the network 300 and connections among the network assets. It should be noted that the passive scanners 220 may also provide their own reports to the vulnerability management system 250, and the vulnerability management system 250 may take into account these reports in building the network topology. When building the network topology, the vulnerability management system 250 may "de-duplicate" information. For example, it may be that applications/services running on endpoint device 330-1 are communicating with applications/services running on endpoint device 330-2. In this instance, the vulnerability management system 250 may recognize that at least some information included in one asset-vulnerability report (e.g., provided from endpoint passive scanner 310 and 230-1) and at least some information included in another asset-vulnerability report (e.g., provided from endpoint passive scanner 310 at 230-2) may be describing the same communication. Thus, the vulnerability management system 250 may treat them accordingly.

It should be noted that the endpoint passive scanner 310 may be configured to build the network topology based on the assets it discovers and/or vulnerabilities it identifies. However, it is more likely that the network topology built by the vulnerability management system 250 will be more complete than the network topology built by individual endpoint passive scanners 310.

As indicated above, the endpoint passive scanner 310 may be configured detect or otherwise obtain information that facilitates discovery of assets and/or identification of vulnerabilities. But instead of or in addition to discovering the assets and/or identifying the vulnerabilities based on the detected information, the endpoint passive scanner 310 may be configured to provide a report of the detected information, also referred to as "detection report", to the vulnerability management system 250. The vulnerability management system 250 in turn may be configured to discover the assets and/or identify the vulnerabilities based on the detection reports from one or more endpoint passive scanners 310. This means that the vulnerability management system 250 may also build the network topology based on the detection reports. The vulnerability management system 250 may also consider information provided from the passive scanners 220 when discovering the assets, identifying the vulnerabilities, and/or building the network topology.

In one implementation, an endpoint passive scanner 310 may be deployed as a passive scan library that can be linked, statically and/or dynamically, to an endpoint agent 320 running on corresponding endpoint device 230. An endpoint passive scanner 310 may run when called by corresponding endpoint agent 320. An endpoint agent 320 may be configured to call corresponding endpoint passive scanner 210 upon startup of corresponding endpoint device 230. For example, when endpoint device 230-1 starts up, the corresponding endpoint agent 320 may call associated endpoint scanner 320, which may be deployed as a library linked to endpoint agent 320.

Note that one or more endpoint agents 320 may be configured to perform a local scan for vulnerabilities. That is, an endpoint agent 320 running on an endpoint device 230 may perform a vulnerability scan of the endpoint device 230. In an implementation, the vulnerability scan performed by the endpoint agent 320 need not be limited to scanning active applications and/or services, i.e., need not be limited to applications/services currently running on the endpoint device 230. The vulnerability scan may also include scan of files accessible by the endpoint device 230 including applications/services that are currently inactive (i.e., not currently running) on the endpoint device 230.

In one implementation, when an endpoint passive scanner 310 discovers the one or more assets and/or identifies the one or more vulnerabilities based on the detected/obtained information and a corresponding endpoint agent 320 performs the vulnerability scan on a corresponding endpoint device 230, the vulnerability scan may be correlated with the discovered assets and/or the identified vulnerabilities. The correlation may be performed by the endpoint passive scanner 310 and/or the endpoint agent 320. A correlation report, which is a report of a result of correlating the discovered assets and/or the identified vulnerabilities with the vulnerability scan, may be provided to the vulnerability management system 250, again by the endpoint passive scanner 310 and/or the endpoint agent 320.

The following are some (not necessarily exhaustive) examples of correlating vulnerability scan data gathered by endpoint agent 320 with passive scan data gathered by endpoint passive scanner 310:

Validating that a patched version of software is actually in use: For example, Google Chrome may be patched to the latest version but not restarted on an endpoint device 230. Endpoint agent scan may not report vulnerabilities because its queries return the newer version. However, passive scan data shows that the older version is still in use.

Linking process activity to network traffic: Endpoint agent scan may show that no 'server' software is installed on the endpoint. A passive scan may see that to be incorrect. This can be used to identify malware or asset inventory or unauthorized installed software.

Identifying credential misuse: Endpoint agent scanner may know existing users that log on to a certain endpoint. Passive scanner may detect different sets of user credentials being transferred. This may indicate issues such as sharing user credentials or malicious activity.

Alternatively, instead of providing the correlation report, the endpoint agent 320 may provide a vulnerability scan report to the vulnerability management system 250. The vulnerability scan report may comprise a result of performing the vulnerability scan. The vulnerability management system 250 may be configured to correlate the discovered assets and/or the identified vulnerabilities (e.g., provided in the asset-vulnerability report) with the vulnerability scan (e.g., provided in the vulnerability scan report).

In another alternative, the endpoint agent 320 may provide the vulnerability scan report to the vulnerability management system 250 when the endpoint passive scanner 310 provides the detection report. In this instance, the vulnerability management system 250 may be configured to discover the assets and/or identify the vulnerabilities based on the detection report (as indicated above). In addition, the vulnerability management system 250 may be configured to correlate the discovered assets and/or the identified vulnerabilities with vulnerability scan (e.g., provided in the vulnerability scan report). The passive scanners 220, active scanners 110, and endpoint scanners 310 and endpoint agents 320 may transmit scan results to the vulnerability management system 250, these scan results may be deconflicted and may be indexed for storage in a database (e.g., SQL).

Figure 4:
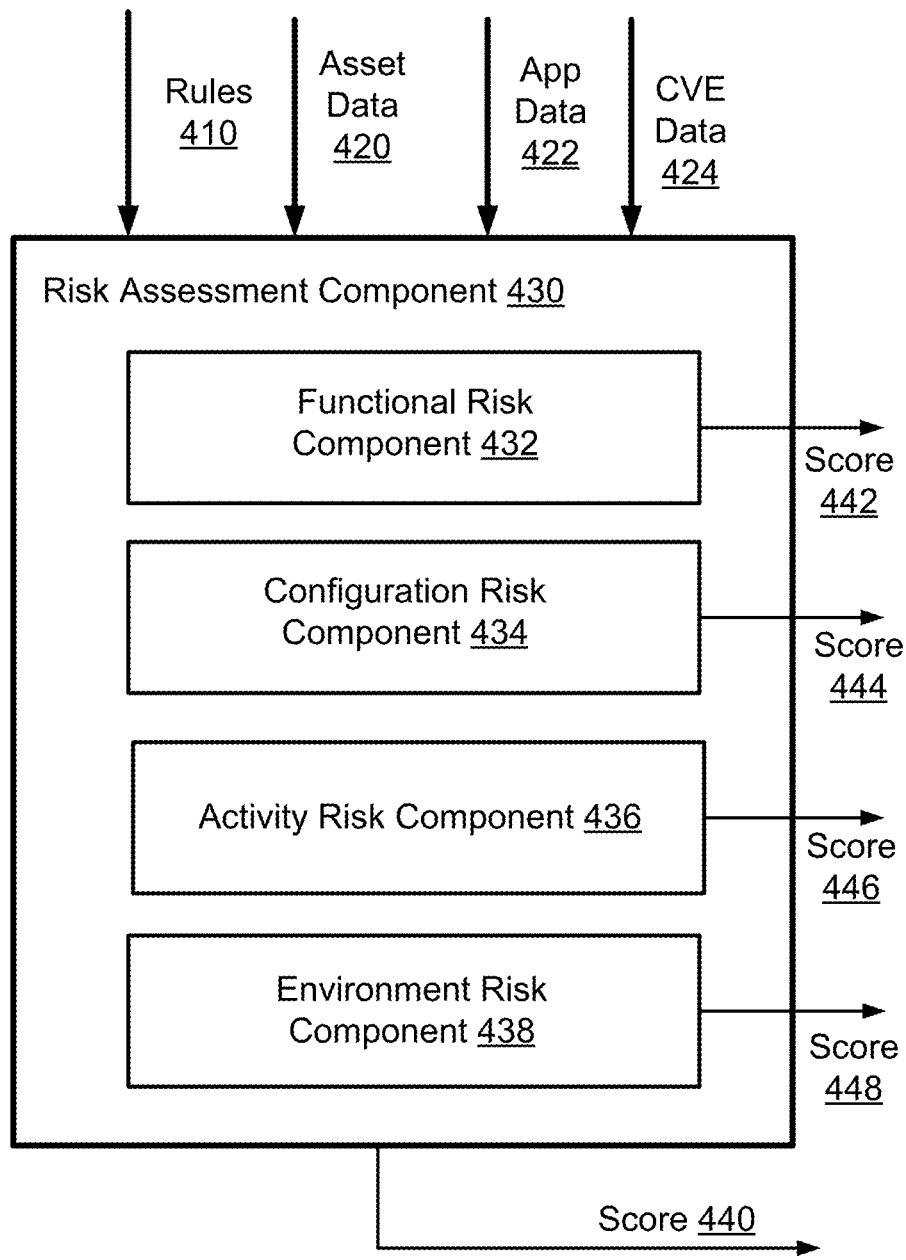
FIG. 4 illustrates a risk asset component, according to various aspects.

In FIG. 4, a risk assessment component 430 is illustrated as receiving various data feeds from assets on the network (e.g., network 100/200) and outputting various risk scores 340-348. The risk assessment component 430 may be a part of the vulnerability management system 150/250 or the log correlation engine 290 and may include hardware and software elements. The risk assessment component 430 may receive rules 410 and CVE data 424 from a database of the network 200 containing such information. The nature of the rules and CVE data are described further below. The risk assessment component 430 may receive asset data 420 from active scanners 110 or passive scanners 120, probes, or endpoint agents on assets (e.g., assets 130). Additionally, the risk assessment component 430 may receive application data 422 which may be derived from scanners, endpoint agents, or enterprise application management services. One or more risk assessment components 430 may be provided in a network 100/200.

In general, these inputs 410, 420, 422, and 424 form a basis for determining intrusion likelihood and exposure risks for assets and endpoint devices 230 of the networks 100/200/300. The CVE data 324 may describe the known vulnerabilities and associated information as described below. The asset data 420 may describe features of each asset of the network including capabilities, functions, use environments, user behavior, asset activity, applications installed, and asset configurations. The application data 422 may describe applications installed on one or more assets. That is, aside from information relating to which applications are installed on assets, application data 422 may describe the configuration, functionality, activity, and environment of the application itself on the asset. The application data 422 may indicate if a application on an asset is currently running/executing, was recently executed, or is scheduled to execute. Then, the rules 410 may be one or more mapping functions or logic to correlate CVE data 424 on vulnerabilities to application data 422 and asset data 420. That is, the rules 410 may connect vulnerabilities to one or more subsets of application data and assets data that would enable to vulnerability to be successfully exploited. The rules 410 may include a risk value or generalized scale that scores particular vulnerability to application data pairs or scores particular vulnerability to asset data pairs, or a combination thereof (e.g., score for application X on asset Y, if vulnerability Z).

The CVE data 424 may include data from NIST/Mitre sources as well as anti-virus providers. The CVE data 424 may include attack paths, associated applications, associated code bases (e.g., libraries or dependencies), code snippets, associated CVEs, and other identification information that may be provided by NIST/Mitre. While the CVE data 424 is illustrated as an input, this data may be co-located on storage at the risk assessment component 430. The rules data 410 may include attributes that characterize an asset in various ways. The rules data 410 may be stored on the risk assessment component 430 and/or provided from a database.

In one example, different attribute classes may be defined, whereby some or all of the rules evaluate whether a particular asset class or set of asset classes applies to a particular asset. In one example, a first attribute class characterizes an asset in terms of location (e.g., a "local" asset that is connected to the managed network via an Intranet behind a customer-controlled internal firewall, or a "remote" asset that is connected to the managed network from a remote location). In a further example, a second attribute class may characterize an asset in terms of device type (e.g., laptop, printer, media player, general purpose, KVM, multimedia, etc.), and a third attribute class characterizes an asset in terms of device capability (e.g., based on which applications are running or installed on the asset, the type of OS installed on the asset, etc.).

For example, at least one of the plurality of rules in a rules table (e.g., data table, SQL) may be based upon asset location. In a more specific example, assume that a first rule maps a first location-based attribute of being locally connected to the managed network to one risk, and a second rule maps a second location-based attribute of being remotely connected to the managed network to another risk. In this case, the risk scores may be different (all things being equal). In an example, whether the one risk (score or estimation) is higher than another risk (score or estimation) may be based upon settings of the vulnerability management system 250 or metrics from prior attacks or an attack path database. However, multiple attributes may affect the estimated risk, a single attribute is not necessarily determinative of the score calculated from such rules in all instances. That is, rules may map one or more attributes of an asset or group of assets (e.g., subnet) to one or more risk scores or values.

In another example, at least one of the plurality of rules is based upon device type and/or device capability. In a more specific example, assume that a first rule maps a first attribute that is characteristic of an entertainment device to one risk, and a second rule maps a second attribute that is characteristic of a consumer device to another risk. As will be appreciated, the nature of the device (e.g., consumer device, enterprise device, industrial device) may be inferred from device type and/or device capability of the asset in terms of hardware characteristic(s) of the asset (e.g., the asset is consumer wearable, or an office device such as a printer, a network switch, a network server, etc.) and/or software characteristic(s) of the asset (e.g., the asset is running entertainment software such as Netflix or a MMORPG, or is running network routing software, etc.). In this case, the risk score of a consumer device will generally be higher than the risk score of an internal network (all things being equal). However, multiple attributes may affect the risk calculation, a single attribute is not necessarily determinative of the relative risk of such rules in all instances. Thus, the capabilities or functions of an asset may be attributes that are then mapped by rules to risk variables (e.g., score, quantity, values).

Other device types and/or device capabilities that may impact risk scores may include certain asset connectivity. For example, a capability of a local asset to access points of communication outside of the Firewall of the managed network (e.g., via phone calls, data transport sessions, etc.) may tend to increase the associated risk score of the local asset (e.g., since the local asset could send sensitive data to non-secure entities). Other examples may include whether or not a particular asset has an RFC1918 address. It will be appreciated that these rules as well as a more generalized rules-based approach whereby risk scores are assigned based on attributes that classify the location, device types, device environment, and/or device capabilities of the assets are provided as examples only. More broadly, any attribute with the potential to indicate a level of risk that a particular asset may be (has the potential to be) compromised by a third party may be factored into one or more risk rules of rules 410.

The asset data 420 may be received at the risk assessment component 430 from a database compiled from devices scans and such or may be a feed of information from scanners and endpoint agents (e.g., real time feed). The asset data 420 may be stored locally in a database or retrieved from the vulnerability management system 250 or log correlation engine 290. This asset data 420 may include CPE data, hardware/network addresses, user information, and other information describing each asset. For example, asset information from a laptop used by a corporate sales department may include device configurations, OS registry, connection history, location history, statistics on use (e.g., time outside of corporate facility, time connecting from outside of the corporate firewall), open connection ports, interfaces, and protocols, and various status flags (e.g., encrypted?, multi-factor authentication?, shared device?, BLUETOOTH on?, etc.).

The asset data 420 may be updated periodically (e.g., every 5 min, 30 min, etc.) from the corresponding endpoint agents on those assets. These updates when provided in real time (or substantially real time) may include activity telemetry (e.g., active connections, programs, file types used, etc.), environment telemetry (e.g., nearby hotspots, BLUETOOTH pairing, public access usage, etc.), and any changes to configuration or functionality of the asset. The telemetry may be a data stream. In the case of real time updates, the processing of the asset data 420 by the risk assessment component 430 is prioritized or used over the processing at the endpoint agent 320. For example, an internet-of-things device and/or its endpoint agent may not process its asset data 420 (due to limited processing power) and instead provides the raw asset data 420 to the risk assessment component 430.

In the case where updates from assets are not real time or are on the order of minutes or hours, the processing of asset data 420 and application data 422 may be performed at the endpoint agent 320. That is, the asset 130 or the endpoint agent 320 on an asset 130 may perform processing such as deduplication, consolidation, generating statistical summaries of activity or environment, or application of risk scores based on rules 410 also received at the endpoint agent. Thus, the endpoint agent 320 may provide the risk assessment component 430 with processed asset data 420, statistics, and risk scores. The supporting asset data 420 may be provided to the risk assessment component 430 with the processed data.

The application data 422 may be specific to applications, programs, libraries, and other executables and processes running on assets of the network 100/200/300. For example, a MOZILLA Firefox application may be monitored to determine the configuration (e.g., cookie storage) of the application, the functionality (e.g., web browsing plus any extensions), the files accessed (e.g., local HTML, local PDF, online HTML, online PHP, etc.), the application usage history including risky IP addresses or hotspots connected to, and other application operation information. The risk assessment component 430 may combine application data 422 with relevant asset data 420 to determine the environment that the application is being used in. For example, the ports (e.g., 8080), protocols (e.g., HTTPS/HTTP/FTP), and wireless hotspot connection security (e.g., WEP encryption) of an asset may be included or applied as the environment of a web browser application. Thus, the usage environment of the application (to the extent relevant to a CVE) may be derived from the environment of the corresponding asset or logs of processes/applications that are executing or running, presently or in the past.

The application data 422 may include an application version being used, libraries accessed by the application, locations used, interfaces (e.g., APIs) of the application, communication protocols used, dependencies for the application, related or commonly connected applications to the application, and other operating conditions of the application. Additional environment information specific to the application may be sent as application data including versions of associated or connected libraries/dependencies, and misuse or modification of the program (e.g., code insertion, developer mode), for example. In summary, application data 422 may include information on configurations, functionality, usage history, and operating environment.

Still with reference to FIG. 4, the risk assessment component 430 may store the information received from the assets and rank or sort the risk of exploitation according to asset, application, or vulnerability (CVE). That is, the risk assessment component 430 may connect to sources of information such as databases or endpoint agents to retrieve rules 410, asset data 420, application data 422, and CVE data 424. The internal components of the risk assessment component 430 that process this data include a functional risk component 432, a configuration risk component 434, an activity risk component 336, and an environment risk component 438. Each of these risk components 432-438 may determine or calculate risk scores for assets and applications in the respective categories of each component. For example, the activity risk component 336 may calculate risk scores for an application on an asset and the asset based on activity data received in the asset data 420 and the application data 422. Likewise, a risk score (e.g., score 440) denoting likelihood of exploitation of an application across assets (e.g., average score or worst-case score) may be calculated by the risk components 432-438 based on the input data 410-424.

The functional risk component 432 may receive rules 410, asset data 420, application data 422, and CVE data 424 (or subsets of this data related to functional operations) and may process the received data inputs into a score 442 for each application or for each asset, or each application on each asset. The score 442 may relate to a likelihood/risk of exposure of an application, an asset, or an application on an asset by a specific or particular vulnerability or a set of vulnerabilities based on the functional information. The configuration risk component 434 may receive rules 410, asset data 420, application data 422, and CVE data 424 (or subsets of this data related to configurations) and may process the received data inputs into a score 444 for each application or for each asset, or each application on each asset of the network 100. The score 444 may relate to a likelihood/risk of exposure of an application, an asset, or an application on an asset by a specific or particular vulnerability or a set of vulnerabilities based on the configuration information.

The activity risk component 436 may receive rules 410, asset data 420, application data 422, and CVE data 424 (or subsets of this data related to operational activity or use) and may process the received data inputs into a score 446 for each application or for each asset, or each application on each asset. The score 442 may relate to a likelihood/risk of exposure of an application, an asset, or an application on an asset by a specific or particular vulnerability or a set of vulnerabilities based on operational activity or usage. The environment risk component 438 may receive rules 410, asset data 420, application data 422, and CVE data 424 (or subsets of this data related to operational environment) and may process the received data inputs into a score 448 for each application or for each asset, or each application on each asset. The score 448 may relate to a likelihood/risk of exposure of an application, an asset, or an application on an asset by a specific or particular vulnerability or a set of vulnerabilities based on the operational environment.

The risk score 442 related to functional aspects, the risk score 444 related to configuration aspects, the risk score 446 related to activity aspects, and the risk score 448 related to environmental aspects may be combined in various ways to form a combined score 440. The combined score 340 may define a risk of exploitation from a vulnerability or set of vulnerabilities for an application or an asset with respect to the functional, configuration, environment, and activity aspects based on a weighting or average of these aspects. That is, these aspects of the risk to an application or an asset or an application on an asset may not be equal for the same application on different assets or for the same asset in two areas of the network. Accordingly, it is contemplated that these scores may change quickly with changed environment, for example.

The scores 440-448 may be provided to a database, a dashboard, a display or other manner of presentation. The scoring for vulnerabilities and sets of vulnerabilities may be individually presented for each application on each asset or for an application or for an asset including all of its applications. The scores 440-448 or 440 may be sorted based on riskiness to depict the applications or assets most vulnerable to exploitation. The scores 440-448 may be logged and may be used to alert security professionals based on a threshold being exceeded by one of the scores 440-448.

Figure 5:
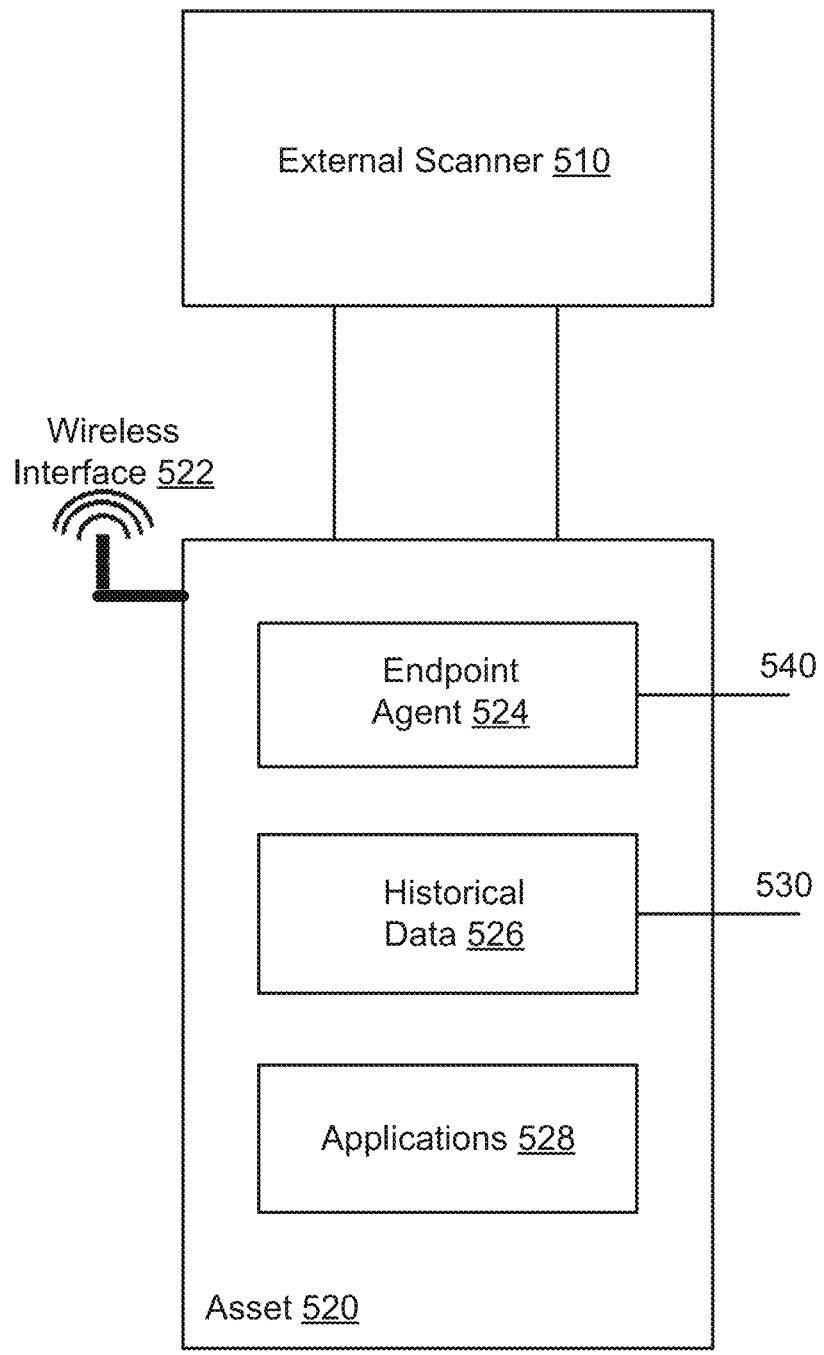
FIG. 5 illustrates an exemplary asset under analysis, according to various aspects.

In FIG. 5 an exemplary asset 520 is illustrated with various connections and outputs. The asset 520 may connect to the enterprise network (e.g., network 100) via wireless interface 522 (e.g., WIFI) or via hardwire connections (e.g., ethernet) to a network via an external scanner 410 (e.g., an active or passive scanner). On the asset 520 are several applications 528 which may be executed to perform functions and may present vulnerabilities and points of intrusion for a hacker separate from the asset 520 itself. In other words, the applications 528 may include public facing connections (e.g., APIs) that may not be detected by external scanner 510. The external scanner 510 and the endpoint agent 524 on the asset 520 may include rules 410 and CVE data 424 to identify vulnerabilities and risks.

The external scanner 510 may collect information about the asset 520 based on transmissions received and transmitted from the asset 510 and may include any of the capabilities of active scanners 110/210 and passive scanners 120/220 noted above. The external scanner may relay this information to the risk assessment component 430 and/or the endpoint agent 524. The endpoint agent 524 (e.g., endpoint agent 320) may be a credentialed application operating (continuously or periodically) on the asset 520 and may record and analyze the functionality, environment, configuration, and activity (usage) data of the asset 520. This data may be analyzed at the endpoint agent 524 which may output scores 440-448 as output 540 for the asset 520 and applications 528 with respect to a vulnerability or set of vulnerabilities. In this case, the endpoint agent 524 may be able to quickly identify vulnerabilities that apply to the asset 520 and/or its applications 528. The endpoint agent 524 may then evaluate the risk of the vulnerabilities relative to the asset 520 or the applications 528 using one or more of the rules 410.

The endpoint agent 524 or the asset 520 may log information related to the activity, environment, functions, and configuration of the asset 520 as historical data 526. The historical data 526 may be transmitted via output 530 to a risk assessment component as asset data 420 and application data 422. This historical data from output 530 may be consolidated information collected from the endpoint agent 524 and the external scanner 510. For example, historical data may include percentage of the time the wireless interface 522 is connected to public wireless connections and not an enterprise wireless of the network. Thus, the historical data 526 may take a longer view on some environmental or activity variables than the endpoint agent 526 which may enable the risk assessment component 430 to assess current risk and long-term risk to the asset 520 or an application of applications 528. The asset 520 may be a laptop, personal computer, router, virtual machine, or the like.

Figure 6:
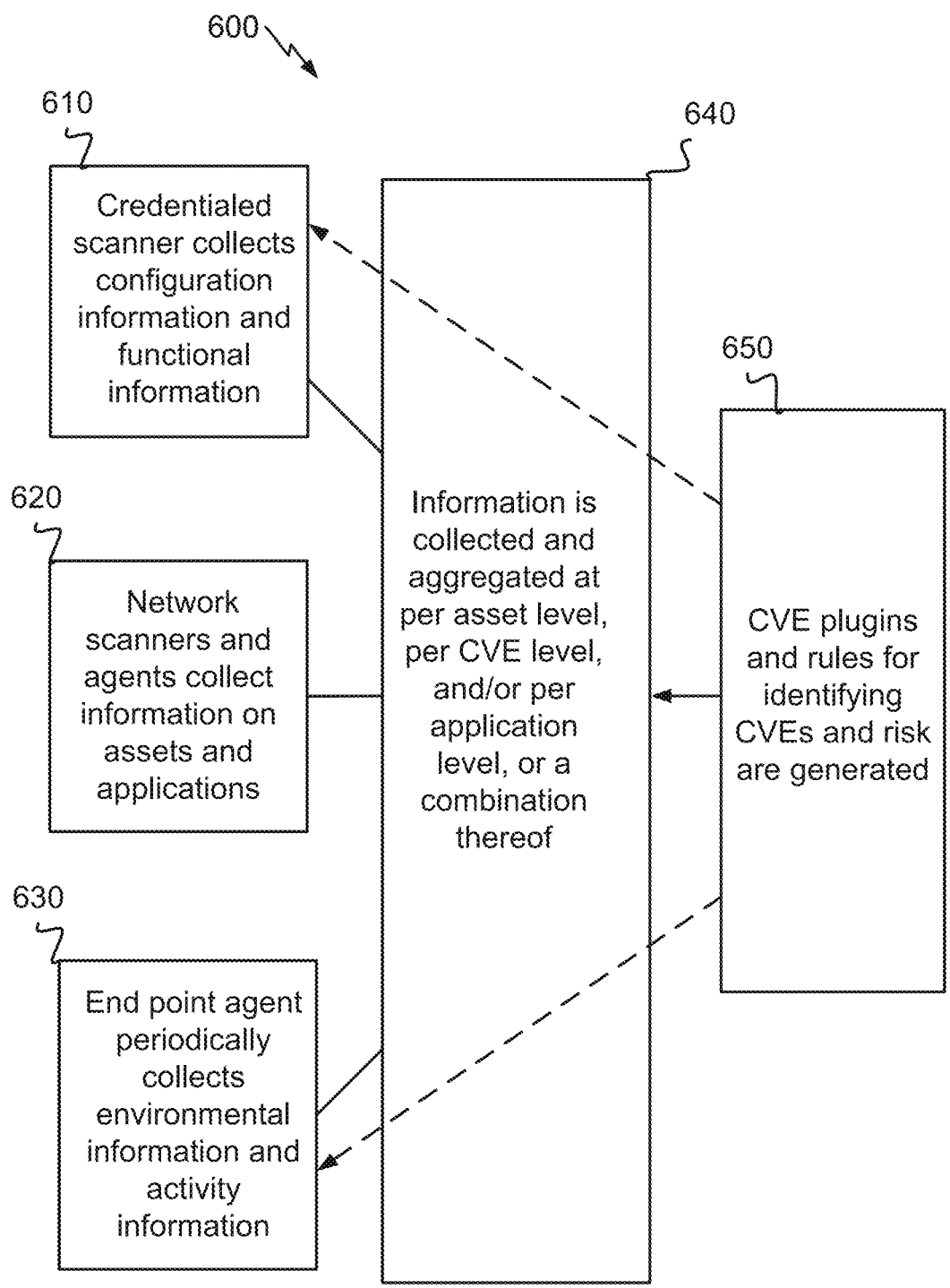
FIG. 6 illustrates a flow of data between processes, according to various aspects.

In FIG. 6 a series of processes are illustrated that operate together as process 600 to assess risks for assets and applications of a network. At 610, a credentialed scanner collects configuration information and functional information from an asset or application. The credentialed scanner may be an active external scanner 510 or an endpoint passive scanner 310. Such a credentialed scanner may have administrative access (e.g., root privilege) to the asset or application so that the configuration and internal functions can be analyzed. At 630, an endpoint agent periodically collects environmental information and activity information from an asset or application. Regular, periodic monitoring of the environment or activity by the endpoint agent may assist in building a complete picture of the risks faced by the application or asset. Such monitoring may be controlled or based on information associated with a particular CVE. At 620, network scanners and agents collect information on the assets and applications from points in the network (e.g., network 100/300). These scanners or agents may detect packets or code snippets that have evaded detection within a compromised asset or application, for example.

At 640, the information collected at 610, 620, 630 may be aggregated at a per asset level, or a per application level, or a per vulnerability (CVE) level, or a combination thereof. Thus, at 640 the information from various endpoints may be aggregated and centralized so that comparison of risk and threats can be made by security professionals. At 650, CVE plugins and rules for identifying CVEs are generated. In other words, vulnerability information may be converted into rules for identifying exposure risk (e.g., rules 410) and converted into plugins to identify particular vulnerabilities at an endpoint. These rules and plugins may be supplied to credentialed scanners and endpoint agents as illustrated by dotted lines, where these rules and plugins are then used to process the information collected at 610 and 630. The rules and plugins may inform the scanners and agents of vulnerabilities to be identified and may inform the scanners and agents of information to log or record periodically. Thus, at 610 and 630 some risk assessment may be performed, and monitoring services may be improved by the plugins and rules.

At 640, the aggregated information may be tagged or labeled on a per asset basis, or per application basis, or both such that vulnerabilities and risk levels may be ascertained for each asset, each application, and each application on each asset, as the case may be. For example, for a vulnerability in an application (e.g., MOZILLA Firefox), the aggregated information may allow presentation or selection of the asset most at risk from the vulnerability in the application (e.g., Joe's laptop with Firefox). To accomplish this, application tags or labels may be automatically labeled with their host asset as well.

Figure 7:
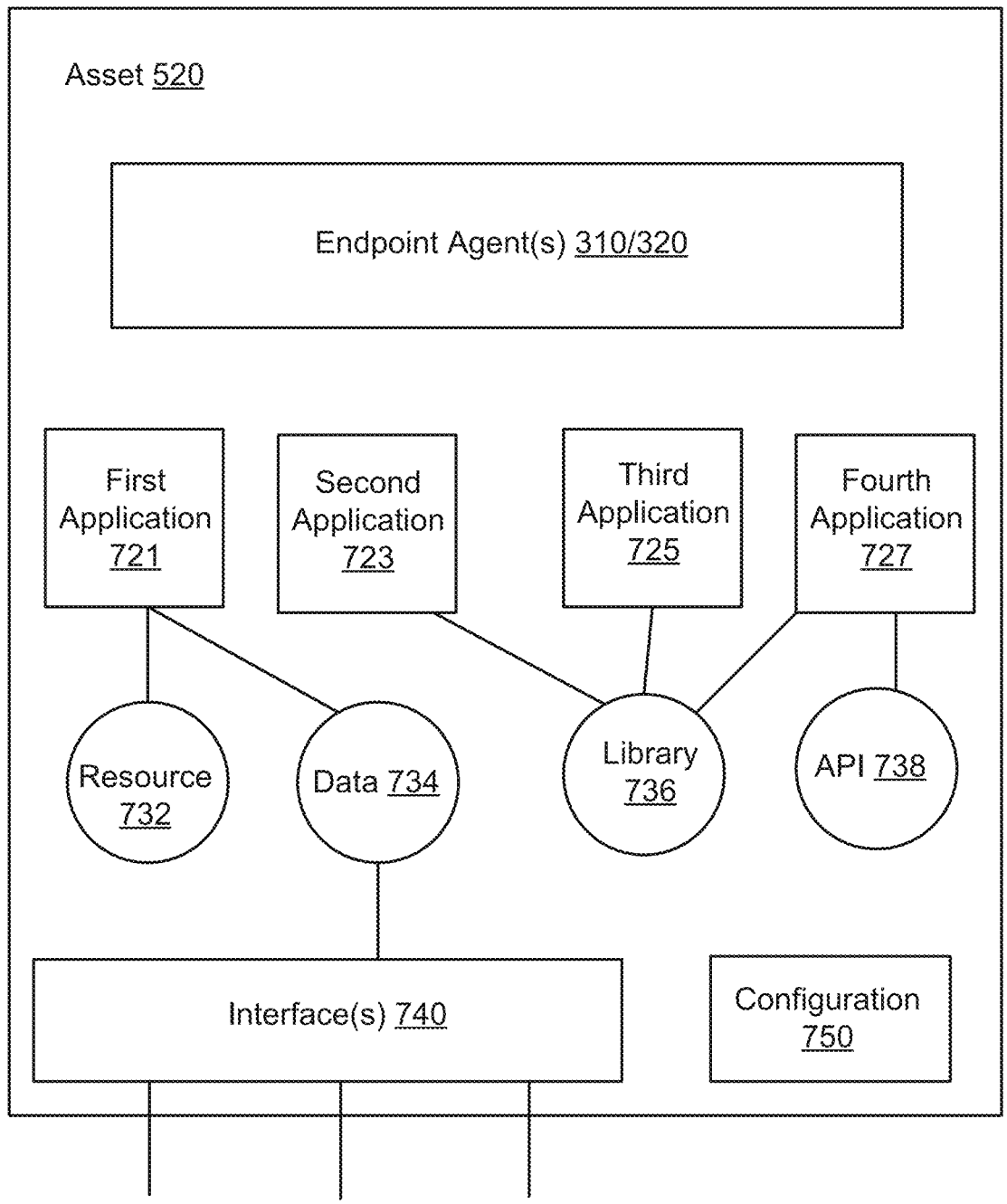
FIG. 7 illustrates an exemplary asset under analysis, according to various aspects.

In FIG. 7 an exemplary asset is illustrated with various applications and other elements hosted on the asset. The system and method described herein provides at least the advantage that even common vulnerabilities manifesting in all of applications 721, 723, 725, and 727 as well as their dependencies 732-738 may be prioritized based on the data collected (e.g., activity, configuration, functions, or environment). Furthermore, where a library 736 is used or incorporated into the operation of one or more applications, the high activity of the library 736 may place its priority over that of any of the applications. Thus, common sources of security issues may be solved quicker or prioritized. For example, the vulnerability known as log 4j is present in applications, libraries, and resources, and each of these hosts of the vulnerability may have a different risk of exploitation based on activity, configuration, functions, or environment.

In FIG. 7 asset 520 includes a first application 721, a second application 723, and third application 725, and a fourth application 727. The first application 721 may connect to a resource 732 (e.g., mathematics engine, graphics engine) and may connect to data 734 (e.g., SQL database), which may connect to interfaces 740 to receive data. The second application 723 may connect to library 736 as may the third application 725 and the fourth application 727. The fourth application 727 may connect to application program interface 738 which may be public-facing or connect to the network, other assets, or applications. The interface 740 may connect to the network 100/200/300 or the internet.

The endpoint agents 310/320 of asset 520 may be equipped with rules 410 and plugins to identify vulnerabilities in one or more of the applications (e.g., second application 723) or the other elements 732-738 of the asset 520. The endpoint agents 310 may also collect activity information, configuration information, functional information, or environmental information from the applications 721-727, elements 732-738, interface 740, and configuration 750. The endpoint agents 310 may perform some risk assessments based on rules 410 provided to them and may transmit the collected information to a central risk assessment component 430 as described above.

The endpoint agent 310 may provide tags for data collected from each of the applications 721-727, elements 732-738, interface 740, and configuration 750 so that activity, functions, configurations, and environment can be isolated or assigned to the correct element where appropriate. Likewise, risk assessments and vulnerabilities determined by the endpoint agent 310 may be associated with the appropriate element 721-750 of asset 520 and reported to the risk assessment component 430 and the vulnerability management system 150/250. The endpoint agent 310 may differentiate between a vulnerability in the second application 723 due to use of the library 736 and a vulnerability native in the second application 723. Likewise, the endpoint agent 310 may identify and record the connections between applications and other elements such that each element 721-750 may have associated elements.

Unique hashes may be generated by the endpoint agent 310 for each element 721-727 of asset 520 and may be used as tags for associations between elements 721-750 and tags for data collected from those elements 721-750. At the risk assessment component 430 these unique hashes or identifiers may allow for selection of single applications on single assets to view risk score, vulnerabilities, and associated applications. Thus, for a vulnerability or set of vulnerabilities the affected applications or elements may be tagged to (associated with) the vulnerability or set of vulnerabilities. Likewise, for assets (e.g., asset 520) a unique identifier may be generated and used to tag all elements of the asset, data from the asset, and vulnerabilities affecting the asset. For example, for a log 4j vulnerability in library 736, resource 732, and first application 721, each of the library 736, resource 732, and first application 721 as well as asset 520 may be associated with the vulnerability (e.g., CVE code) and each may have a separate risk score based on information collected from the endpoint agent and other monitoring.

Figure 8:
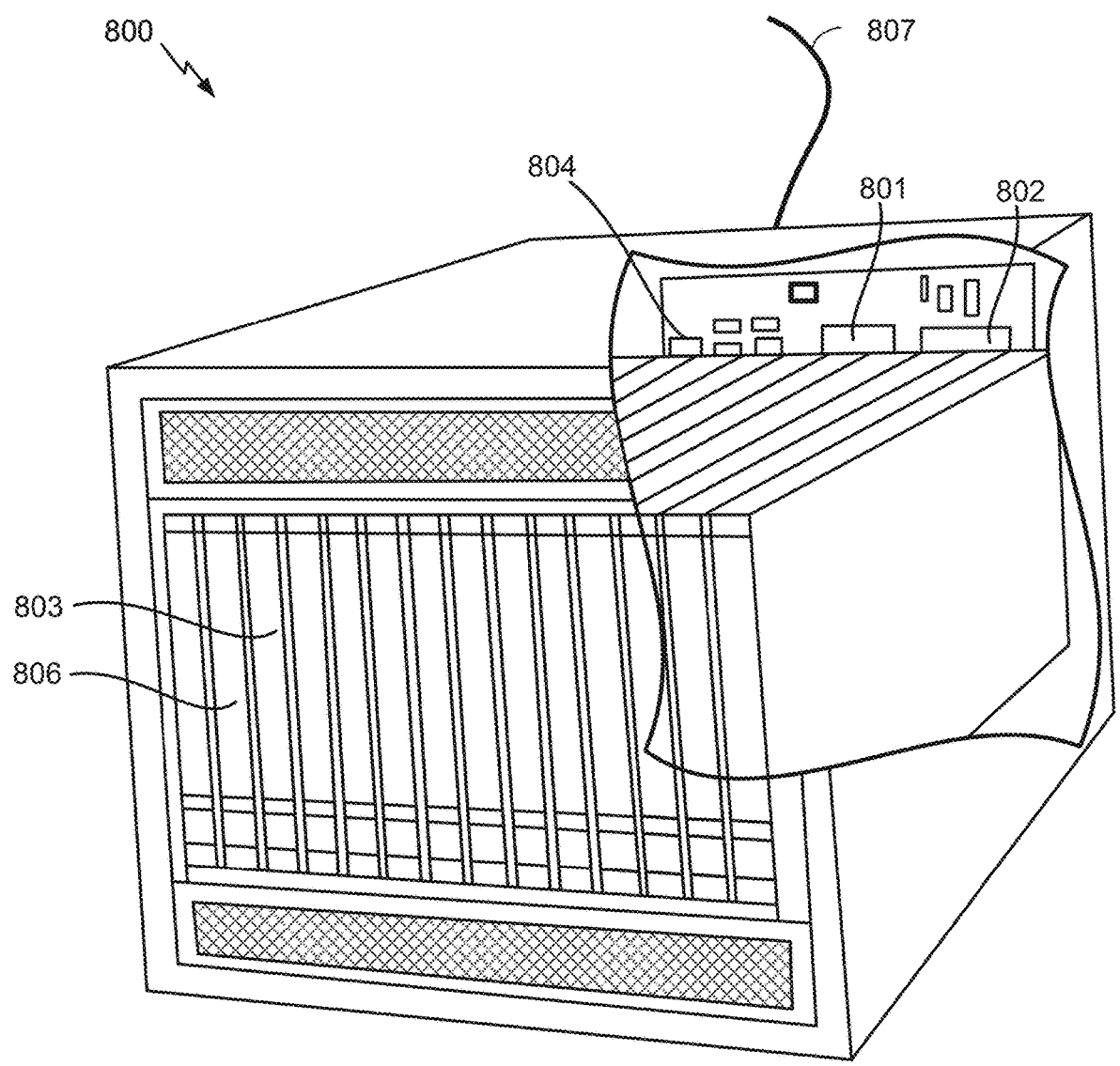
FIG. 8 illustrates an apparatus, according to various aspects of the disclosure, according to various aspects.

In FIG. 8, the apparatus 800 may include one or more processors 801 coupled to volatile memory 802 and a large capacity nonvolatile memory, such as a disk drive 803. The apparatus 800 may also include a floppy disc drive, flash/solid state media drive, compact disc (CD) or DVD disc drive 806 coupled to the one or more processors 801. The apparatus 800 may also include network access ports 804 coupled to the one or more processors 801 for establishing data connections with a network 807, such as a local area network coupled to other broadcast system computers and servers or to the Internet. The network access ports 804 may be more broadly described as communicators 804.

Figure 9:
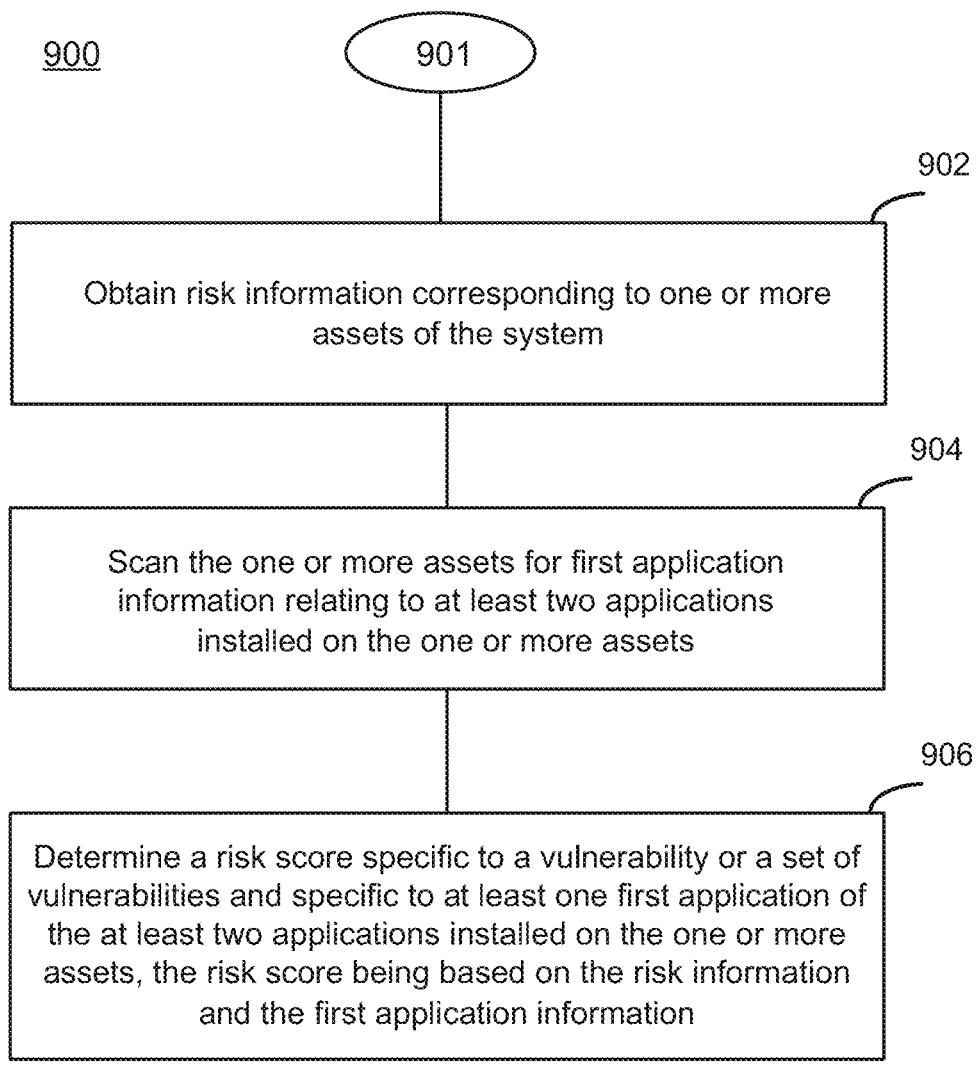
FIG. 9 illustrates a process according to various aspects.

In FIG. 9, a process 900 for prioritizing vulnerabilities in applications of a system is illustrated according to an implementation. At 901, an endpoint agent or risk assessment component may initiate the process 900 including operations 902-906. At 902, an operation may obtain risk information corresponding to one or more assets of the system. At 904, an operation may scan the one or more assets for first application information relating to at least two applications installed on the one or more assets. At 906, an operation may determine a risk score specific to a vulnerability or a set of vulnerabilities and specific to at least one first application of the at least two applications installed on the one or more assets, the risk score being based on the risk information and the first application information. For example, at least the endpoint agents 320, endpoint scanners 310, the risk assessment engine 430, or processors 801 may be considered means for performing the operations of process 900.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of prioritizing vulnerabilities in applications of a system, the method comprising: obtaining risk information corresponding to one or more assets of the system; scanning the one or more assets for first application information relating to at least two applications installed on the one or more assets; and determining a risk score specific to a vulnerability or a set of vulnerabilities and specific to at least one first application of the at least two applications installed on the one or more assets, the risk score being based on the risk information and the first application information.

Clause 2. The method of clause 1, wherein obtaining the risk information comprises: obtaining a first set of risk factors corresponding to activity or environment of the one or more assets; and obtaining a second set of risk factors corresponding to functions or configurations of the one or more assets; or obtaining a third set of risk factors corresponding to activity or environment of the applications on the one or more assets; and obtaining a fourth set of risk factors corresponding to functions or configurations of the applications on the one or more assets.

Clause 3. The method of clause 2, wherein the first set of risk factors includes one or more activity indicators corresponding to behavior of users of the one or more assets, to activity in the applications of the one or more assets, to usage patterns of at least one interface of the one or more assets, or a combination thereof, and wherein the first set of risk factors includes one or more environmental indicators corresponding to connection history of the one or more assets, to hosting of public facing resources, to encryption status, to sharing of the one or more assets, or a combination thereof.

Clause 4. The method of any of clauses 2 to 3, wherein the second set of risk factors includes one or more functional risk indicators corresponding to connection capabilities of the asset, installed application program interfaces (APIs), accessibility from public internet, access permissions, or a combination thereof, and wherein the second set of risk factors includes one or more configuration risk indicators corresponding to auto-connect settings, auto-play settings, open ports, registry settings, API configurations, auto-update settings, or a combination thereof.

Clause 5. The method of any of clauses 2 to 4, wherein the determining further comprises: obtaining one or more rules corresponding to the vulnerability or the set of vulnerabilities; determining whether the one or more rules apply to one or more of the at least two applications; and generating a first risk score if the one or more rules apply to an application of the at least two applications, or generating a second risk score if the one or more rules do not apply to an application of the at least two applications, wherein the first risk score or the second risk score for the application are generated based on the risk score being based on the first set of risk factors, the second set of risk factors, and the first application information that corresponds to the application.

Clause 6. The method of any of clauses 2 to 5, wherein the first set of risk factors and the second set of risk factors are applied as weights in determining the risk score for the particular vulnerability for the at least one application.

Clause 7. The method of any of clauses 2 to 6, wherein, in determining the risk score, the first set of risk factors and the second set of risk factors are scaled based on a risk correlation with the at least one application.

Clause 8. The method of any of clauses 1 to 7, the determining further comprising: determining a separate risk score for the vulnerability or set of vulnerabilities corresponding to each application of the at least two applications installed on the one or more assets.

Clause 9. The method of any of clauses 1 to 8, wherein the first application information includes a version record, one or more dependencies required by one or more of the at least two applications, one or more libraries accessed by one or more of the at least two applications, or one or more containers or databases managed by the at least two applications.

Clause 10. The method of any of clauses 1 to 9, further comprising: sorting a list of the at least two applications for each of the one or more assets based on risk scores specific to the vulnerability or the set of vulnerabilities and specific to each application of the at least two applications.

Clause 11. A system to prioritize vulnerabilities, the system comprising: a memory; and at least one processor coupled to the memory, wherein the memory and the at least one processor are configured to: obtain risk information corresponding to one or more assets; scan the one or more assets for first application information related to at least two applications installed on the one or more assets; and determine a risk score specific to a vulnerability or a set of vulnerabilities and specific to at least one first application of the at least two applications installed on the one or more assets, the risk score being based on the risk information and the first application information.

Clause 12. The system of clause 11, wherein obtaining the risk information comprises: obtaining a first set of risk factors corresponding to activity or environment of the one or more assets; and obtaining a second set of risk factors corresponding to functions or configurations of the one or more assets; or obtaining a third set of risk factors corresponding to activity or environment of the applications on the one or more assets; and obtaining a fourth set of risk factors corresponding to functions or configurations of the applications on the one or more assets.

Clause 13. The system of clause 12, wherein the first set of risk factors includes one or more activity indicators corresponding to behavior of users of the one or more assets, to activity in the at least two applications on the one or more assets, to usage patterns of at least one interface of the one or more assets, or a combination thereof, and wherein the first set of risk factors includes one or more environmental indicators corresponding to connection history of the one or more assets, to hosting of public facing resources, to encryption status, to sharing of the one or more assets, or a combination thereof.

Clause 14. The system of any of clauses 12 to 13, wherein the second set of risk factors includes one or more functional risk indicators corresponding to connection capabilities of the asset, installed application program interfaces (APIs), accessibility from public internet, access permissions, or a combination thereof, and wherein the second set of risk factors includes one or more configuration risk indicators corresponding to auto-connect settings, auto-play settings, open ports, registry settings, API configurations, auto-update settings, or a combination thereof.

Clause 15. The system of any of clauses 12 to 14, wherein the first set of risk factors and the second set of risk factors are applied as weights in determining the risk score for the vulnerability or the set of vulnerabilities for the at least one application.

Clause 16. The system of any of clauses 12 to 15, wherein, in determining the risk score, the first set of risk factors and the second set of risk factors are scaled based on a risk correlation with the at least one application.

Clause 17. The system of any of clauses 11 to 16, further comprising: a display with a graphical user interface (GUI), the GUI configured to: sort a list of the at least two applications for each of the one or more assets based on risk scores specific to the vulnerability or the set of vulnerabilities and specific to each application of the at least two applications.

Clause 18. The system of any of clauses 11 to 17, wherein the memory and the at least one processor are configured to: obtain one or more rules corresponding to the vulnerability or the set of vulnerabilities; determine whether the one or more rules apply to one or more of the at least two applications; and generate a first risk score if the one or more rules apply to an application of the at least two applications, or generate a second risk score if the one or more rules do not apply to an application of the at least two applications, wherein the first risk score or the second risk score for the application are generated based on the risk score, the risk score being based on the risk information and the first application information that corresponds to the application.

Clause 19. The system of any of clauses 11 to 18, wherein the memory and the at least one processor are configured to: determine a separate risk score for the vulnerability or the set of vulnerabilities that is specific to each application of the at least two applications installed on the one or more assets.

Clause 20. The system of any of clauses 11 to 19, wherein the first application information includes a version record, one or more dependencies required by one or more of the at least two applications, one or more libraries accessed by one or more of the at least two applications, or one or more containers or databases managed by the at least two applications.

Clause 21. A system that determines risk of vulnerability exploitation, the system comprising: at least two hardware or virtual hardware assets, the at least two hardware or virtual hardware assets having at least two software applications installed thereon; at least one endpoint agent that: extracts first application information corresponding to the at least two software applications, logs environmental and activity information for the at least two hardware or virtual hardware assets, the environmental and activity information corresponding to a first set of risk factors, collects functional information corresponding to the at least two software applications, collects configuration information corresponding to the at least two software applications, the functional information and the configuration information corresponding to a second set of risk factors, and generates a risk score for exploitation of a vulnerability or a set of vulnerabilities for each application of the at least two software applications based on the first set of risk factors, the second set of risk factors, and the first application information.

Clause 22. The system of clause 21, wherein the risk scores for exploitation of the vulnerability or the set of vulnerabilities are generated for each application of the at least two software applications on each asset of the at least two hardware or virtual hardware assets such that a particular risk score of the risk scores is associated with a particular asset, application, and vulnerability combination.

Clause 24. An apparatus comprising means for performing a method according to any of clauses 1 to 10.

Clause 25. A non-transitory computer-readable medium storing computer-executable instructions, the computer-executable comprising at least one instruction for causing a computer or processor to perform a method according to any of clauses 1 to 10.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, flash/solid state media, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of prioritizing vulnerabilities in applications of a system, the method comprising:
   obtaining risk information corresponding to one or more assets of the system;
   scanning the one or more assets for first application information relating to at least two applications installed on the one or more assets;
   determining a risk score of a vulnerability or a set of vulnerabilities that is specific to a first application of the at least two applications installed on the one or more assets, the risk score of the vulnerability or the set of vulnerabilities being based on the risk information and the first application information, wherein the risk score is based on the presence or absence of one or more asset-specific attributes required for successful exploitation of the vulnerability or the set of vulnerabilities, wherein the risk score is one of a plurality of risk scores, each of the plurality of risk scores associated with a respective vulnerability or a respective set of vulnerabilities associated with the one or more assets; and sorting the plurality of risk scores to facilitate remediation of associated vulnerabilities in order of riskiness.

2. The method of claim 1, wherein obtaining the risk information comprises:
   obtaining a first set of risk factors corresponding to activity or environment of the one or more assets; and
   obtaining a second set of risk factors corresponding to functions or configurations of the one or more assets; or
   obtaining a third set of risk factors corresponding to activity or environment of the applications on the one or more assets; and
   obtaining a fourth set of risk factors corresponding to functions or configurations of the applications on the one or more assets.

3. The method of claim 2, wherein the first set of risk factors includes one or more activity indicators corresponding to behavior of users of the one or more assets, to activity in the applications of the one or more assets, to usage patterns of at least one interface of the one or more assets, or a combination thereof, and
   wherein the first set of risk factors includes one or more environmental indicators corresponding to connection history of the one or more assets, to hosting of public facing resources, to encryption status, to sharing of the one or more assets, or a combination thereof.

4. The method of claim 2, wherein the second set of risk factors includes one or more functional risk indicators corresponding to connection capabilities of the asset, installed application program interfaces (APIs), accessibility from public internet, access permissions, or a combination thereof, and
   wherein the second set of risk factors includes one or more configuration risk indicators corresponding to auto-connect settings, auto-play settings, open ports, registry settings, API configurations, auto-update settings, or a combination thereof.

5. The method of claim 2, wherein the determining further comprises:
   obtaining one or more rules corresponding to the vulnerability or the set of vulnerabilities;
   determining whether the one or more rules apply to one or more of the at least two applications; and
   generating a first risk score if the one or more rules apply to an application of the at least two applications, or
   generating a second risk score if the one or more rules do not apply to an application of the at least two applications,
   wherein the first risk score or the second risk score for the application are generated based on the risk score being based on the first set of risk factors, the second set of risk factors, and the first application information that corresponds to the application.

6. The method of claim 2, wherein the first set of risk factors and the second set of risk factors are applied as weights in determining the risk score for a particular vulnerability for at least one application.

7. The method of claim 2, wherein, in determining the risk score, the first set of risk factors and the second set of risk factors are scaled based on a risk correlation with at least one application.

8. The method of claim 1, the determining further comprising:
   determining a separate risk score for the vulnerability or the set of vulnerabilities corresponding to each application of the at least two applications installed on the one or more assets.

9. The method of claim 1, wherein the first application information includes a version record, one or more dependencies required by one or more of the at least two applications, one or more libraries accessed by one or more of the at least two applications, or one or more containers or databases managed by the at least two applications.

10. The method of claim 1, further comprising:
    sorting a list of the at least two applications for each of the one or more assets based on vulnerability risk scores specific to each application of the at least two applications.

11. A system to prioritize vulnerabilities, the system comprising:
    a memory; and
    at least one processor coupled to the memory,
    wherein the memory and the at least one processor are configured to:
    obtain risk information corresponding to one or more assets;
    scan the one or more assets for first application information related to at least two applications installed on the one or more assets;
    determine a risk score of a vulnerability or a set of vulnerabilities that is specific to at least one first application of the at least two applications installed on the one or more assets, the risk score of the vulnerability or the set of vulnerabilities being based on the risk information and the first application information,
    wherein the risk score is based on the presence or absence of one or more asset-specific attributes required for successful exploitation of the vulnerability or the set of vulnerabilities,
    wherein the risk score is one of a plurality of risk scores, each of the plurality of risk scores associated with a respective vulnerability or a respective set of vulnerabilities associated with the one or more assets; and
    sort the plurality of risk scores to facilitate remediation of associated vulnerabilities in order of riskiness.

12. The system of claim 11, wherein obtaining the risk information comprises:
    obtaining a first set of risk factors corresponding to activity or environment of the one or more assets; and
    obtaining a second set of risk factors corresponding to functions or configurations of the one or more assets; or
    obtaining a third set of risk factors corresponding to activity or environment of the applications on the one or more assets; and
    obtaining a fourth set of risk factors corresponding to functions or configurations of the applications on the one or more assets.

13. The system of claim 12, wherein the first set of risk factors includes one or more activity indicators corresponding to behavior of users of the one or more assets, to activity in the at least two applications on the one or more assets, to usage patterns of at least one interface of the one or more assets, or a combination thereof, and wherein the first set of risk factors includes one or more environmental indicators corresponding to connection history of the one or more assets, to hosting of public facing resources, to encryption status, to sharing of the one or more assets, or a combination thereof.

14. The system of claim 12, wherein the second set of risk factors includes one or more functional risk indicators corresponding to connection capabilities of the asset, installed application program interfaces (APIs), accessibility from public internet, access permissions, or a combination thereof, and wherein the second set of risk factors includes one or more configuration risk indicators corresponding to auto-connect settings, auto-play settings, open ports, registry settings, API configurations, auto-update settings, or a combination thereof.

15. The system of claim 12, wherein the first set of risk factors and the second set of risk factors are applied as weights in determining the risk score of the vulnerability or the set of vulnerabilities for at least one application.

16. The system of claim 12, wherein, in determining the risk score, the first set of risk factors and the second set of risk factors are scaled based on a risk correlation with at least one application.

17. The system of claim 11, further comprising:
a display with a graphical user interface (GUI), wherein the memory and the at least one processor are configured to:
sort a list of the at least two applications for each of the one or more assets based on vulnerability risk scores specific to each application of the at least two applications.

18. The system of claim 11, wherein the memory and the at least one processor are configured to:
obtain one or more rules corresponding to the vulnerability or the set of vulnerabilities;
determine whether the one or more rules apply to one or more of the at least two applications; and
generate a first risk score if the one or more rules apply to an application of the at least two applications, or
generate a second risk score if the one or more rules do not apply to an application of the at least two applications,
wherein the first risk score or the second risk score for the application are generated based on the risk score, the risk score being based on the risk information and the first application information that corresponds to the application.

19. The system of claim 11, wherein the memory and the at least one processor are configured to:
determine a separate risk score for the vulnerability or the set of vulnerabilities that is specific to each application of the at least two applications installed on the one or more assets.

20. The system of claim 11, wherein the first application information includes a version record, one or more dependencies required by one or more of the at least two applications, one or more libraries accessed by one or more of the at least two applications, or one or more containers or databases managed by the at least two applications.

21. A system that determines risk of vulnerability exploitation, the system comprising:
at least two hardware or virtual hardware assets, the at least two hardware or virtual hardware assets having at least two software applications installed thereon; and
at least one endpoint agent that:
extracts first application information corresponding to the at least two software applications,
logs environmental and activity information for the at least two hardware or virtual hardware assets, the environmental and activity information corresponding to a first set of risk factors,
collects functional information corresponding to the at least two software applications,
collects configuration information corresponding to the at least two software applications, the functional information and the configuration information corresponding to a second set of risk factors, and
generates a risk score for exploitation of a vulnerability or a set of vulnerabilities for each application of the at least two software applications based on the first set of risk factors, the second set of risk factors, and the first application information,
wherein the risk score is based on the presence or absence of one or more asset-specific attributes required for successful exploitation of the vulnerability or the set of vulnerabilities,
wherein the risk score is one of a plurality of risk scores, each of the plurality of risk scores associated with a respective vulnerability or a respective set of vulnerabilities associated with the one or more assets; and
sorts the plurality of risk scores to facilitate remediation of associated vulnerabilities in order of riskiness.

22. The system of claim 21, wherein the risk scores for exploitation of the vulnerability or the set of vulnerabilities are generated for each application of the at least two software applications on each asset of the at least two hardware or virtual hardware assets such that a particular risk score of the risk scores is associated with a particular asset, application, and vulnerability combination.

* * * * *